United States Patent [19]

Scullard et al.

[11] 4,106,941

[45] Aug. 15, 1978

[54] PHOTOGRAPHIC SILVER HALIDE ELEMENTS CONTAINING OPTICAL BRIGHTENING WATER-SOLUBLE INTERPOLYMERS

[75] Inventors: Peter W. Scullard, Webster; John Figueras, Rochester; Carl F. Holtz, Webster, all of N.Y.

[73] Assignee: Eastman Kodak Company, Rochester, N.Y.

[21] Appl. No.: 489,192

[22] Filed: Jul. 17, 1974

[51] Int. Cl.$^2$ .................... G03C 1/92; G03C 1/84
[52] U.S. Cl. .................... 96/82; 96/84 UV; 96/115 R; 526/240; 526/259; 526/260; 526/261; 526/270; 526/271; 526/272; 427/158; 526/267

[58] Field of Search ............... 96/82, 84 UV, 115 R; 427/158

[56] References Cited

U.S. PATENT DOCUMENTS

| | | | |
|---|---|---|---|
| 2,875,053 | 2/1959 | Minsk | 96/84 |
| 3,453,110 | 7/1969 | Delzenne et al. | 96/115 R |
| 3,615,544 | 10/1971 | Amano et al. | 96/82 |

*Primary Examiner*—Jack P. Brammer
*Attorney, Agent, or Firm*—Arthur H. Rosenstein

[57] ABSTRACT

Interpolymers from monomers containing optical brightening moieties and solubilizing groups are useful in optical brightening compositions. Photographic elements containing these optical brightening compositions have excellent light stability.

13 Claims, No Drawings

PHOTOGRAPHIC SILVER HALIDE ELEMENTS CONTAINING OPTICAL BRIGHTENING WATER-SOLUBLE INTERPOLYMERS

This invention relates to novel interpolymers and more particularly, to optical brightening compositions containing the interpolymers. In a particularly preferred embodiment, the optical brightening compositions are useful in photographic elements.

The white areas of photographic prints and other products such as fibrous and plastic articles are often made to look whiter by incorporating optical brightening agents. The optical brightening agents flouresce on irradiation with U.V. (ultraviolet) light, emitting visible light, usually bluish in hue thus enhancing the whiteness of the object. Optical brightening agents for use in photographic print materials must absorb U.V. light especially in the region from 360 to 400 mμ and efficiently convert this invisible light into visible light to enhance the whiteness and they must have the desired brightening power. The optical brighteners must also be stable to the temperatures as high as 310° to 330° C used in incorporating them in plastics and in extruding the plastic materials in the desired form such as fibers, sheets, etc, if they are to be of any value in the finished product. Furthermore, the optical brighteners must be nonmigrating so that they remain in the plastic material where they are needed and do not exude as a surface film on the plastic which readily transfers to any other surface contacted with it.

A problem inherent in many of the prior art optical brightening agents is that they generally are unstable to light. Various methods of improving the light stability of brighteners include the preparation of dilute solid solutions of these brighteners in polymers having high glass transition temperatures such as disclosed in U.S. Pat. No. 3,684,729, issued Aug. 15, 1972 and U.S. application Ser. No. 847,404, filed Aug. 4, 1969, now abandoned. While this method improves light stability, it has been found to be necessary to use relatively large volumes of solvent in dispersion preparation. Also, the oleophilic layer is thick and when incorporated in a photographic paper, doctor wandering can be encountered in rawstock keeping and undesirable yellowing can occur on post-process, high-humidity storage.

In order to avoid the above problems, water-soluble, optical brighteners can be used. However, the light stability of the water-soluble brighteners is generally poor and the water-soluble brighteners have a tendency to wander or, if ballasted, form micelles which decrease stability and fluorescence.

It is, therefore, an object of this invention to provide interpolymers having improved brightening properties and light stability derived from monomers containing optical brightening moieties and solubilizing groups.

A further object of this invention is to provide a photographic element containing the optical brightening agents of this invention.

A still further object of this invention is to provide an image-receiving element containing the optical brighteners of this invention.

It has been found according to the invention that interpolymers derived from monomers containing optical brightening moieties and solubilizing groups provide the described improved brightening properties and light stability. In one embodiment of this invention, optical brightening compositions containing the described interpolymers are incorporated in photographic elements. In a further embodiment of this invention, optical brightening compositions containing the interpolymers are incorporated in an image-receiving element.

The interpolymers of this invention are derived from monomers containing optical brightening moieties and solubilizing groups. The interpolymers are represented by the formula:

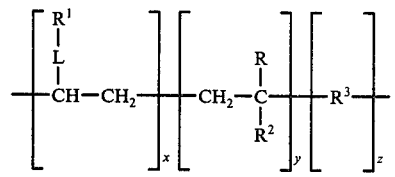

wherein L is a linking group, such as a linking group selected from the group consisting of CONH, O, COO,

S, $SO_2$ and

$R^1$ is an optical brightener moiety; R is H or alkyl containing from 1 to 4 carbon atoms; $R^2$ is an anionic solubilizing group selected from the group consisting of COOM, $SO_3M$, $OSO_3M$, $COOR^4OSO_3M$, $PO_3$ and $PO_4$ wherein M is H or an alkali metal and $R^4$ is alkylene containing from 1 to 4 carbon atoms; $R^3$ is a unit derived from a copolymerizable ethylenically usaturated monomer; $x$ is from 0.25 to 50 mole percent; $y$ is from 5 to 99 mole percent; and $z$ is from 9 to 90 mole percent of the total interpolymer.

The linking group L is a divalent group which links the brightening moiety with the vinyl group. The linking group is generally selected from the group consisting of CONH, O, COO,

S, $SO_2$ and

$R^1$ is an optical brightening moiety which absorbs in the near UV region and emits in the blue region. A detailed description of optical brightening moieties and well known commercial optical brightening agents is found in Allen, *Color Chemistry,* Chapter 20, pages 278-286, Appleton-Century-Crofts, 1971, which is incorporated herein by reference.

R is hydrogen or alkyl containing from 1 to 4 carbon atoms, such as methyl, ethyl, isopropyl, butyl, and the like.

$R^2$ is an anionic solubilizing group selected from the group consisting of COOM, $SO_3M$, $OSO_3M$, COOR- $^4OSO_3M$, $PO_3$ and $PO_4$, where M is hydrogen or an alkali metal such as sodium, potassium, and the like; and $R^4$ is alkylene containing from 1 to 4 carbon atoms, such as methylene, ethylene, propylene, butylene and the like.

$R^3$ is a unit derived from a copolymerizable ethylenically unsaturated monomer and preferably is of the formula:

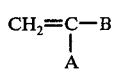

wherein A is hydrogen or alkyl containing from 1 to 6 carbon atoms such as methyl, ethyl, propyl, butyl, isopentyl, hexyl, and the like; and B is $COOR^5$, $COR^5$, CN, or

wherein $R^5$ is alkyl containing from 1 to 6 carbon atoms such as methyl, ethyl, isopropyl, butyl, pentyl, hexyl, and the like.

The terms alkyl and aryl as used throughout the specification and claims include substituted alkyl and substituted aryl such as chloromethyl, bromophenyl and the like. Any material which does not interfere with the optical brightening property of the polymer may be used as a substituent for alkyl and aryl groups defined herein.

Preferred optical brightening moieties according to this invention include stilbenes such as 4,4'-bis-(5-methoxybenzoxazol-2-yl)stilbene; 4,4'-bis-(5,7-di-tert-amylbenzoxazol-2-yl)stilbene; 4,4'-bis-(4,6-dimethoxy-s-triazin-2-yl amino)stilbene; and the like; coumarins such as 7-diethylamino-4-methylcoumarin; 7-(4-chloro-6-N,N-diethylamino-s-triazin-2-yl amino)-3-phenylcoumarin; 3-phenyl-7-[2-dimethylaminoethyl)-ureido]-coumarin; 7-(4-acrylamido-6-N,N-diethylamino-s-triazin-2-yl amino)-3-phenylcoumarin; 7-acrylamido-3-phenylcoumarin and the like; thiophenes such as 2,5-dibenzoxazolyl thiophene; 2,5-bis(5,7-di-tert-amylbenzoxazol-2-yl)thiophene; 2,5-bis {2-[5-(1-methylpropyl)-benzoxazolyl]} -thiophene; 6-ethyldibenzoxazolylthiophene; and the like; and benzoxazoles such as 2,2'-[vinylenebis-(p-phenylene)]-benzoxazole; 2,2'-[vinylene-bis-(p-phenylene)]-5,7-di-tert-amylbenzoxazole; and the like.

Other examples of optical brightening moieties according to the invention are those having the formula:

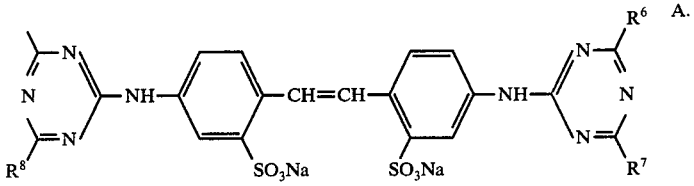

wherein $R^6$, $R^7$ and $R^8$ are independently selected from the group consisting of hydrogen; OH; alkyl containing up to 15 carbon atoms; aralkyl; alkoxy, typically alkoxy containing 1 to 4 carbon atoms; aryl; halogen; amino, both unsubstituted and substituted with, for example, alkyl, aryl or aralkyl; and

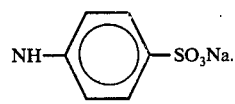

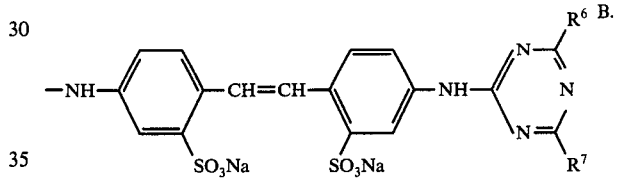

wherein $R^6$ and $R^7$ are as defined above.

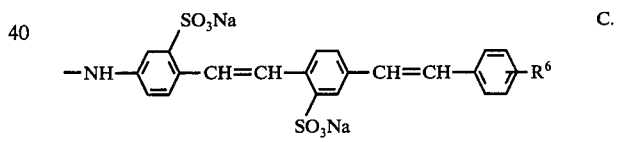

wherein $R^6$ is as defined above; and

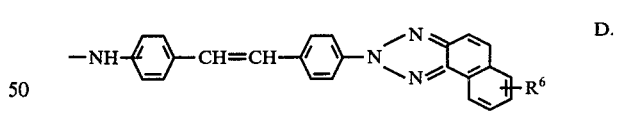

wherein $R^6$ is as defined above.

Examples of preferred optical brightening moieties according to the invention are:

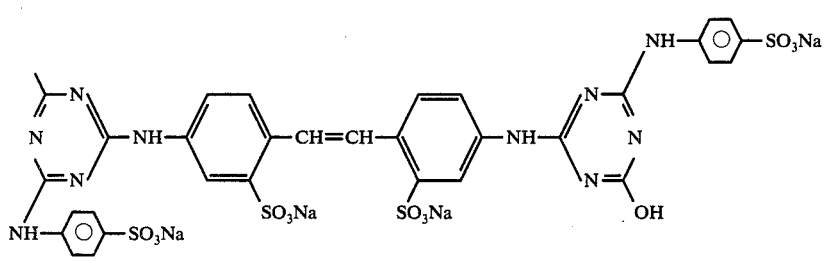

-continued

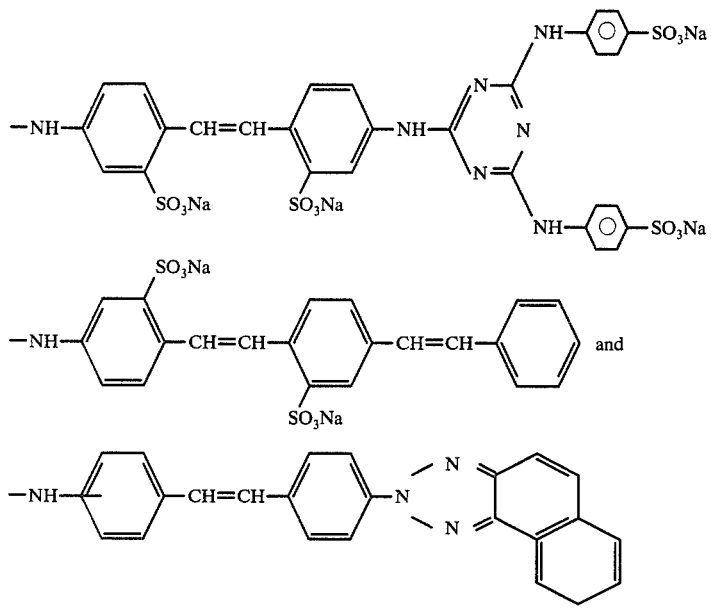

Examples of typical ethylenically unsaturated monomers according to the invention are butyl acrylate, acrylonitrile, methylvinyl ketone, dimethylacrylamide, and the like.

The interpolymer comprises from about 0.25 to about 50 mole percent of the optical brightening unit ($x$ is from 0.25 to 50 mole percent and preferably from 2 to 25 mole percent), from about 5 to about 99 mole percent of the solubilizing unit ($y$ is from 5 to 99 mole percent and preferably from 10 to 75 mole percent), and optionally up to 90 mole percent of the copolymerizable monomer ($z$ is from 0 to 90 mole percent). It is preferred that the brightening moiety $R^1$ comprises from about 1 to about 50 percent by weight of the interpolymer.

Some examples of interpolymers according to the invention are:

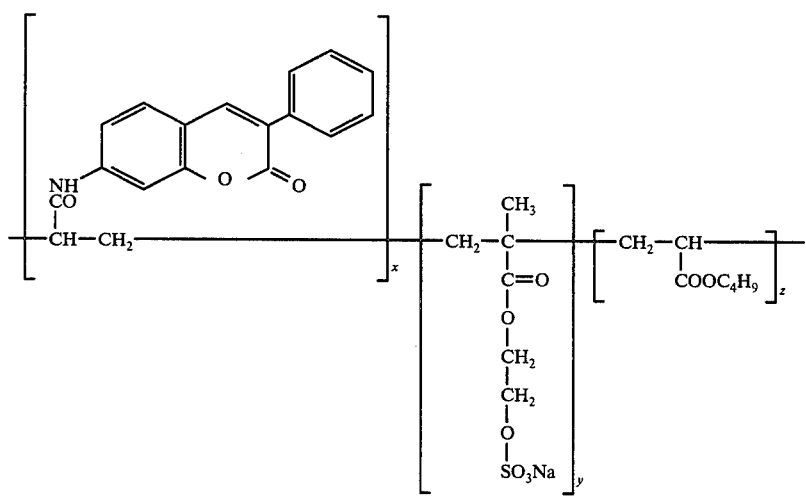

1)

2)
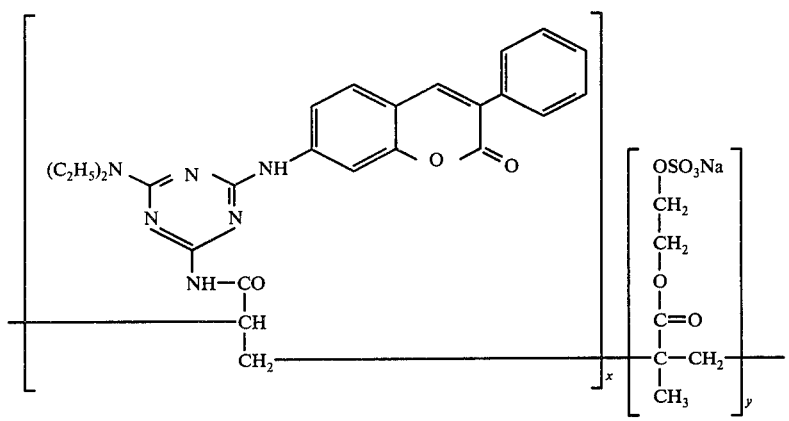
3)
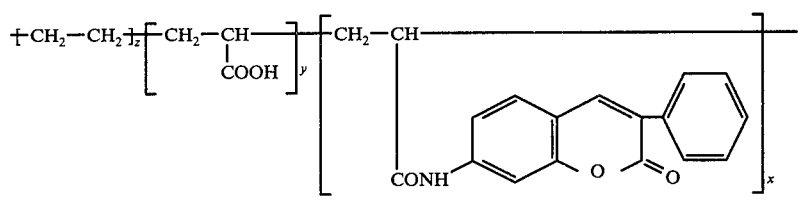
4)
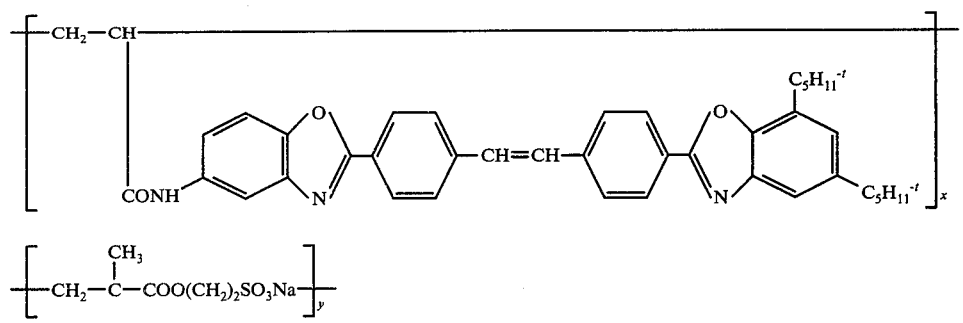
5)
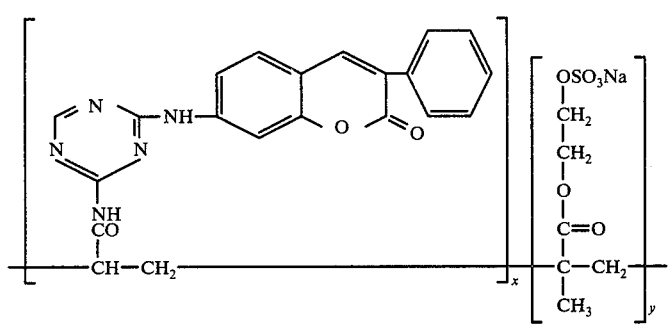
6)
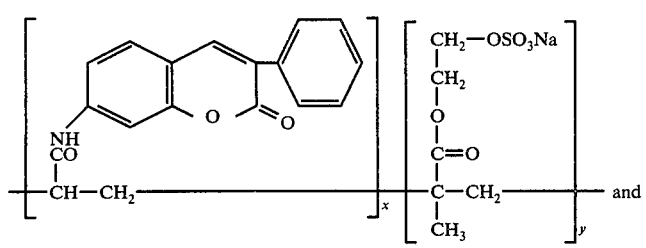
and

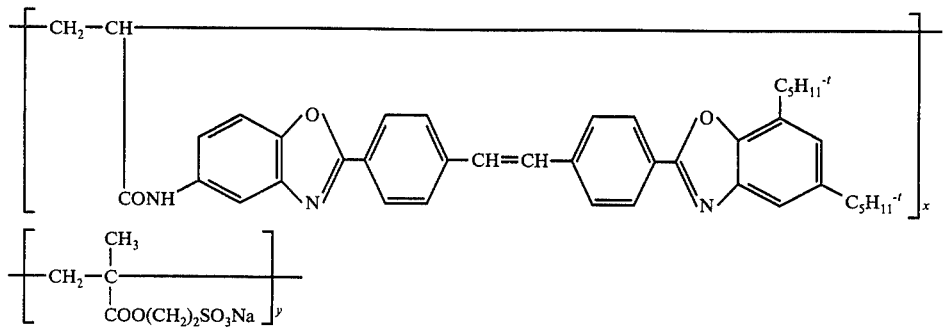

wherein x, y and z are as defined.

The novel interpolymers are prepared by interpolymerization techniques. The interpolymerization techniques and conditions described in the following Example 1 are typical of those useful in preparing those interpolymers. Generally, the monomers are polymerized in a solvent such as dimethylformamide, dimethyl sulfoxide, hexamethylphosphorous triamide, or the like, in a nitrogen atmosphere in a temperature range of from 25° to about 100° C. Free radical initiators such as peroxides, or azobisisobutyronitrile can be used and the solution is reacted for up to 16 hours or more. Examples of useful polymerizable monomers containing brightening moieties are 3-phenyl-7-acrylamidocoumarin, and the like. Examples of useful polymerizable monomers containing solubilizing groups are acrylic acid; methacrylic acid; sodium methacryloyloxyethylsulfate; sodium α-methacryloyloxy-propanesulfonate; acrylamide; acryloyloxypropionic acid; 2-carbethoxyallylsulfuric acid, sodium salt; 4-acryloyloxybutane-1-sulfonic acid, sodium salt; 3-acryloyloxy-1-methylpropane-1-sulfonic acid, sodium salt; chlorofumaric acid; chloromaleic acid; α-chloroacrylic acid; β-acryloyloxyethyl monophosphate; β-acryloyloxypropyl potassium acid phosphate; β-acryloyloxy-propyl monophosphate; 4,4,9-trimethyl-8-oxo-7-oxa-4-azo-9-decene-1-sulfonic acid; β-methacryloyloxyethyl monophosphate; β-methacryloyloxypropyl potassium acid phosphate; ethylenesulfuric acid, sodium salt; fumaric acid; itaconic acid; maleic acid; mesaconic acid; α-methylene glutaric acid; 2-methacryloyloxy-ethylsulfuric acid, sodium salt; crotonic acid; 2-sulfoethyl methacrylate; p-styrene sulfonic acid, potassium salt; 3-acryloyloxypropane-1-sulfonic acid, sodium salt; 3-methacryl-oyloxypropane-1-sulfonic acid, sodium salt; 3-methacryloyl-oxypropane-1-methyl-1-sulfonic acid, sodium salt; 4-methacryl-oyloxybutane-1-sulfonic acid, sodium salt; 2-methacryloyloxy-ethyl-1-sulfonic acid, sodium salt; 2-acrylamido-2-methyl-propane sulfonic acid; vinyl sulfonic acid, sodium salt; and the like; and other ethylenically unsaturated monomers including such monomers as butyl acrylate, acrylonitrile, and the like.

Brightening compositions containing the optical brightening interpolymers described above generally contain hydrophilic binders including both naturally occurring substances such as proteins, for example, gelatin, gelatin derivatives, cellulose derivatives, polysaccharides, such as dextran, gum arabic, and the like; and synthetic polymeric substances such as water-soluble polyvinyl compounds such as poly(vinyl pyrrolidone), acrylamide polymers and the like. Gelatin is a preferred binder.

In a preferred embodiment, the binders and interpolymers are used in a photographic element and the interpolymer comprises from about 0.05 grams per 929 square centimeters to about 5.0 grams per 929 square centimeters.

Any of the conventional photographic support materials can be used advantageously for making photographic elements containing the novel brightening agents of the invention. These include photographic paper supports, such as paper coated with a reflection pigment, e.g., barium sulfate, titanium dioxide, or zinc oxide, paper or other fibrous material coated with a hydrophobic resin, such as poly(ethylene terephthalate), polyethylene, polypropylene, poly(3-methylbutene-1), poly(octene-1), polyamides, polyacetals, polycarbonates, cellulose triacetate, cellulose acetate butyrate, and ethyl cellulose which are advantageously treated with corona discharge techniques just prior to coating the first gelatin layer over the resin such as described in U.S. Pat. No. 3,220,842, issued Nov. 30, 1965, U.S. Pat. No. 2,864,755, issued Dec. 16, 1958 and U.S. Pat. No. 2,864,756, issued Dec. 16, 1958, glass, conventional photographic film supports, such as poly(ethylene terephthalate), cellulose acetate, cellulose nitrate, and metal. Baryta is coated in the range from about 0.9 to 6.5 grams per 929 square centimeters, preferably in the range from 1.8 to 5.6 grams per 929 square centimeters.

Any hydrophilic colloid silver halide emulsions containing silver bromide, silver iodide, silver chloride, silver bromoiodide, silver chlorobromide, silver chlorobromoiodide, and the like, well known in photography are useful in the photographic elements. The silver halide emulsion layers for color photographic elements advantageously contain colorforming couplers or are of the type that are color developed with color developer solutions containing the appropriate couplers.

Hydrophilic binders containing the optical brightening agents of this invention can be located in a photographic element according to the invention wherever an ultraviolet absorbing brightener is needed. For example, the brightening agents can be in, over, or under a light-sensitive layer coated on any of the described supports, between two or more light-sensitive layers on any of the described supports, or in a layer containing a reflection pigment such as are described. Brighteners according to the invention are particularly useful in photographic print materials, and in image-receiving elements for diffusion transfer.

In these processes, a light-sensitive diffusion transfer element containing a light-image exposed silver halide emulsion is processed with the exposed emulsion layer in contact with the silver precipitating layer of an image-receiving element in the presence of a silver halide developing agent, such as hydroquinone, 1-phenyl-3-pyrazolidone, p-methylaminophenol, a silver halide solvent or complexing agent, such as an alkali metal thiocyanate, ammonium thiocyanate, and the like. In a particularly useful process, a thickening agent, such as carboxymethylcellulose, or carboxyethylcellulose, is used. During development, undeveloped silver halide forms a complex with the complexing agent which diffuses in an imagewise manner to the silver-precipitating layer on the image-receiving element where a silver image is precipitated from the silver halide complex. In an integral element, a silver halide emulsion coated over a silver precipitating layer is removed such as by washing, to disclose the transferred image. In a color diffusion transfer process, an image-exposed light-sensitive silver halide color diffusion transfer element is contacted with the receiving layer of an image-receiving element in the presence of a developer solution which causes the release of a diffusible dye image that transfers to the mordanted receiving layer. The desired dye image remains in the receiving layer when the receiving element is separated from the developed diffusion transfer element. The diffusible dye image is formed from an incorporated non-diffusible coupler that couples with an imagewise pattern of oxidized primary aromatic amine color developing agent, produced by development of light-exposed silver halide. In another system, the dye image is formed from incorporated dye developing agents, such as hydroquinone derivatives that contain a chromophore as a substituent; the hydroquinone form of these compounds forms in the alkaline developer solution a diffusible dye while the dye developer that is oxidized to the quinone form (when it develops light-exposed silver halide to silver) is insoluble and does not diffuse to the image-receiving layer.

The brightening agents of this invention are advantageously used in image-receiving elements. The image-receiving elements generally comprise a support as described previously that has been coated in succession with (1) a baryta layer containing the brightening composition, and (2) an image-receiving layer for a silver image comprising any of the hydrophilic colloids such as have been described before, containing a dispersion of a silver precipitating agent or an image-receiving layer for a dye image comprising any of the hydrophilic colloids such as have been described before, containing a basic mordant for mordanting acid solubilized diffusible dyes. Usually, it is advantageous to have a hydrophobic resin layer between the baryta layer and the image-receiving layer. Hydrophobic resins that are advantageously used include poly(ethylene terephthalate), polyethylene, polypropylene, poly(3-methylbutene-1), poly(octene-1), poly(decene-1), polyamides, polyacetate, polycarbonates, cellulose triacetate, cellulose acetate butyrate, ethyl cellulose, etc; preferably the hydrophobic resin layer is treated with corona discharge techniques just prior to coating the first hydrophilic colloid layer over the resin as described, for example, in U.S. Pat. No. 3,220,842, issued Nov. 30, 1965, U.S. Pat. No. 2,864,755, issued Dec. 16, 1958 and U.S. Pat. No. 2,864,756, issued Dec. 16, 1958. In one alternative structure, the baryta layer and brightening composition layers are coated separately between the support and image-receiving layer. In still another alternative structure, the image-receiving element comprises a support coated with a hydrophilic colloid layer containing both the brightening composition and a silver precipitating agent or mordant (for a dye transfer image).

A variety of known silver precipitants are useful in the described receiving layer. Examples of a useful silver precipitating agent and of image-receiving elements containing such silver precipitating agents, are described, for instance, in U.S. Pat. Nos. 2,698,237, 2,698,238 and 2,698,245 of Land, issued Dec. 28, 1954; U.S. Pat. No. 2,774,667 of Land and Morse, issued Dec. 16, 1956; U.S. Pat. No. 2,823,122 of Land, issued Feb. 11, 1958; U.S. Pat. No. 3,396,018, of Beavers et al, issued Aug. 6, 1968; and also U.S. Pat. No. 3,369,901, of Fogg et al, issued Feb. 20, 1968. The noble metals, such as silver, gold, platinum, palladium, and the like, in colloidal form are particularly useful.

Noble metal nuclei are particularly active and useful when formed by reducing a noble metal salt using a borohydride or hypophosphite in the presence of a colloid as described in Rasch, U.S. Pat. No. 3,647,440, issued Mar. 7, 1972. The metal nuclei are prepared in the presence of a proteinaceous colloid such as gelatin and coated on the receiving element. The coating composition generally contains not only nuclei, but also reaction products which are obtained from reducing the metal salt.

The amount of colloid used in preparing the above active noble metal nuclei can be varied depending upon such factors as the particular colloid, reducing agent, and ratio of proportions. Typically, about 0.5% to about 20% by weight based on the total reaction mixture of colloid is used, preferably from about 1% to about 10%.

In a particularly useful embodiment, 30 to 80 mg. per 929 square centimeters of the active noble metal nuclei in 80 mg. of colloid (solids basis) is coated per 929 square centimeters of support. The colloid binder is advantageously coated in a range of about 5 to about 500 mg per 929 square centimeters. Suitable concentrations on the receiving sheets of active noble metal nuclei as disclosed above can be about 1 to about 200 mg. per 929 square centimeters. Other silver precipitants can be coated in a concentration of up to 5 mg per 929 square centimeters.

A variety of known mordants that have a charge opposite to the charge of the dye being transferred are useful in the image-receiving elements for dye transfer images. Since most of the useful photographic image-transfer dyes have acidic solubilizing groups, basic or cationic mordants are generally used. Typical mordants are ogranic quaternary phosphonium salts, organic ternary sulfonium salts and organic quaternary ammonium salts. Suitable mordants include polymers of amino guanidine derivatives of vinyl methyl ketone described in Minsk, U.S. Pat. No. 2,882,156. Other suitable mordants include the 2-vinyl pyridine polymer metho-p-toluene sulfonate, poly 4-vinyl pyridine, thorium salts and similar compounds described in Sprague et al U.S. Pat. No. 2,484,430.

The following examples are included for a further understanding of the invention.

EXAMPLE 1

A solution of 0.2006 g. of 3-phenyl-7-acrylamidocoumarin and 10 g. of sodium methacryloyloxyethylsulfate in 70 cc. dry dimethylformamide was heated to 60° C under a nitrogen atmosphere. To this solution was added 0.25 g. azobisisobutyronitrile. The solution was kept at 60° C for four hours under $N_2$ and poured into an ether bath. The resulting gum was triturated with ether and mixed with acetonitrile in a blender. The resulting interpolymer was a white powder having the structure:

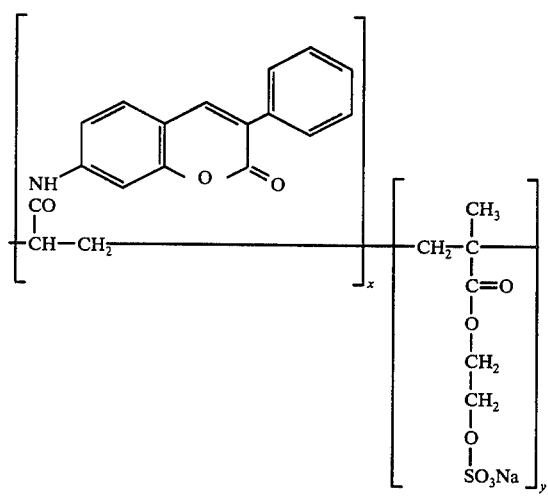

wherein $x = 1.9$ mole percent and $y = 98.09$ mole percent.

EXAMPLE 2

Single-layer, paper supported gelatin coatings were prepared by adding gelatin and spreading agent to water solutions of the following three interpolymers:

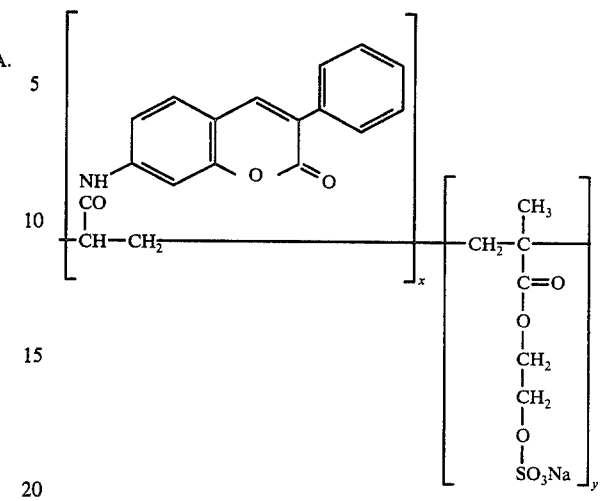

where $x$ is 3.75 mole percent and $y$ is 96.25 mole percent;

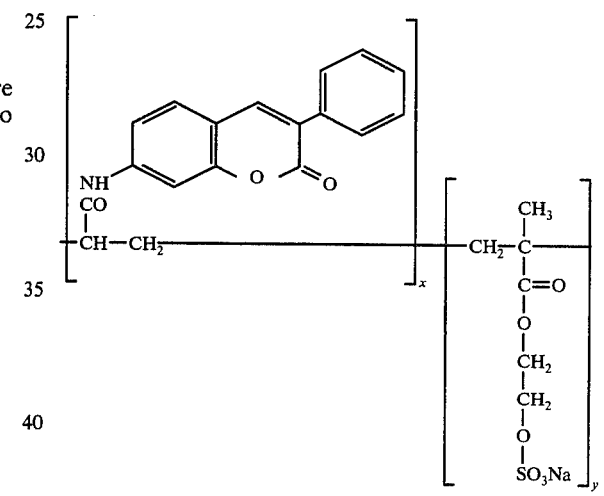

where $x$ is 1.91 mole percent and $y$ is 98.09 mole percent; and

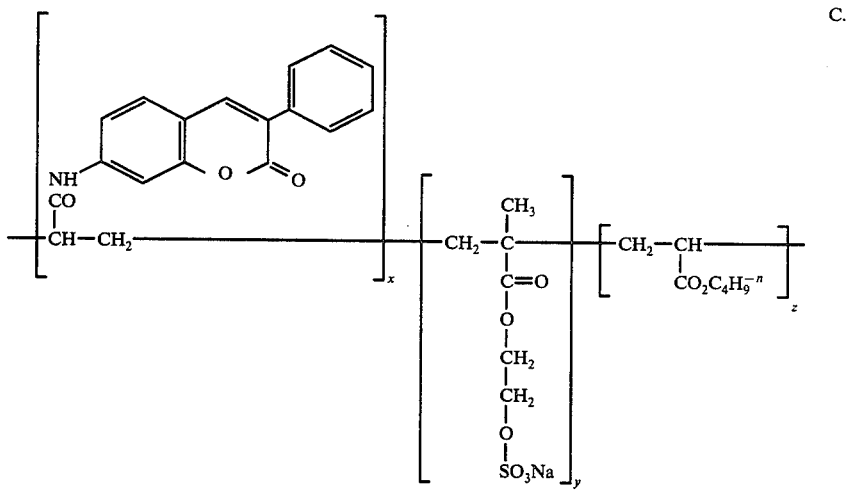

where $x$ is 1.4 mole percent, $y$ is 35.0 mole percent and $z$ is 63.6 mole percent, and coating on paper support.

The optical brightening properties of the above interpolymers of this invention were compared to the optical brightening properties of a closely related monomeric brightener comprising a 1 percent by weight solution of

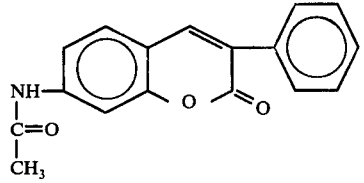

in dibutyl phthalate. The fluorescence intensity, peak radiance, and light stability under a SANS Xenon fadometer at 500 foot-candles held at 70° F and 50% relative humidity for 2 weeks is shown in Table 1.

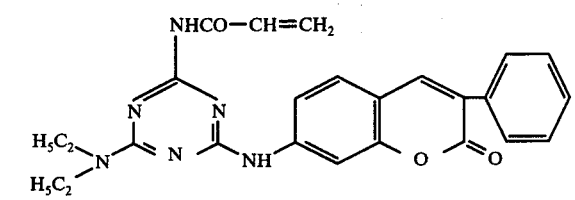

as follows.

A sample of a supported single-layer coating containing per 929 square centimeters of coating 500 mg. of gelatin and 10 mg. of the above monomer dissolved in 500 mg. of dibutylphthalate was subjected to a two-week SANS light-fading test, and designated as the control. A sample of a supported single-layer coating containing per 929 square centimeters of coating 500 mg. of gelatin and 260 mg. of polymer was subjected to Table 1

| Example | Melt Composition mg/ft$^2$ | Emission max (nm) | Fluorescence intensity after 365 nm. irradiation ($I_f$) | Peak radiance (% reflectance w/ white light) | Light stability (% Δ $I_f$) |
| --- | --- | --- | --- | --- | --- |
| 2A | 130 mg. polymer 125 mg. gelatin | 438 | 40 | 90 | 21 |
| 2B | 255 mg. polymer 250 mg. gelatin | 434 | 42 | 91 | 5 |
| 2C | 255 mg. polymer 250 mg. gelatin | 435 | 47 | 91 | 7 |
| Control | 10 mg. monomer 1000 mg. dibutyl phthalate 600 mg. gelatin | 437 | 16 | no peak | 69 |

It is seen from Table 1 and by visual testing that the polymeric brightener-containing coatings of this invention are much whiter than the monomeric brightener-containing coatings despite the fact that the monomeric brightener-containing coating was coated at twice the level of optical brightener of the invention.

EXAMPLE 3

The optical brightening properties of an interpolymer having the formula:

the same light-fading test. The results are shown in Table 2.

Table 2

| | | Percent Fluorescence Emission Remaining After | |
| --- | --- | --- | --- |
| Example | Brightener | 1 week | 2 weeks |
| Control | monomer | 10 | 10 |
| 3 | polymer | 67 | 50 |

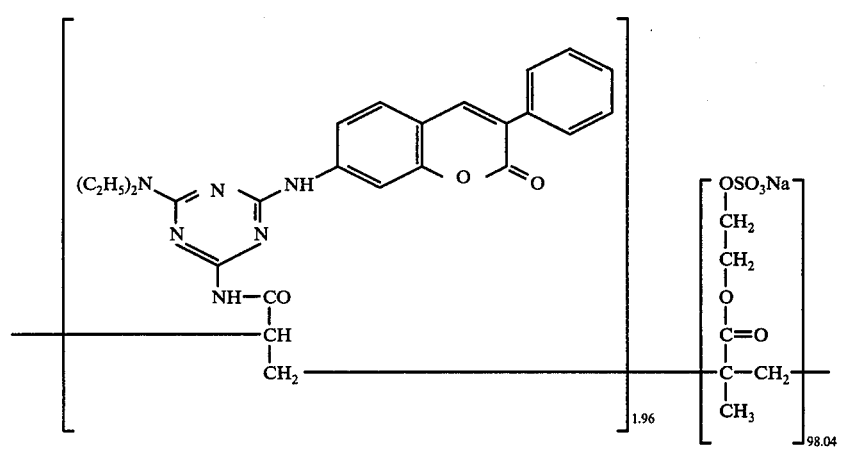

were compared to those of a like monomer having the formula:

EXAMPLE 4

The optical brightening properties of an interpolymer having the formula:

EXAMPLE 5

The optical brightening properties of an interpolymer having the formula:

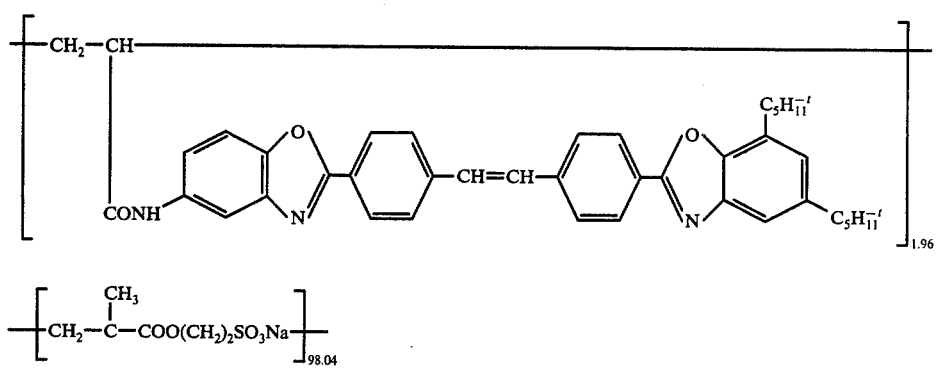

were compared to those of a like monomer having the formula:

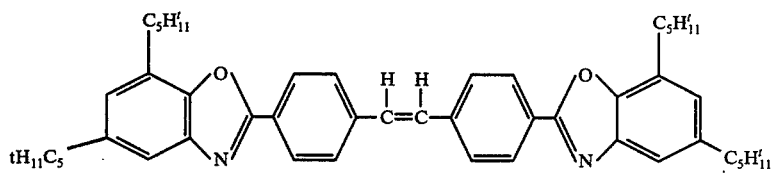

as follows.

Control A was prepared by coating a single-layer coating containing per 929 square centimeters 500 mg. of gelatin and 11.8 mg. of the monomer dissolved in 180 mg. of dibutyl phthalate and subjected to a SANS light-fading test. The results of the light-fading test are monitored by plotting density at 380 nm. vs. fading time and interpolating to obtain the half-life ($t_{\frac{1}{2}}$) of the brightener in the coating. Control B was prepared as above except that 500 mg. of dibutyl phthalate were used.

Example 5 was prepared by coating a single-layer containing per 929 square centimeters of coating 500 mg. of gelatin and 183 mg. of polymer and subjecting to the same light-fading test. The results are shown in Table 4.

Table 4

| Example | Brightener | SANS ($t_{\frac{1}{2}}$) | Optical Density at max 364 nm. |
|---|---|---|---|
| Control A | monomer | 0.2 day | 1.74 |
| Control B | monomer | 0.6 day | 1.86 |
| 5 | polymer | 12.7 days | 1.41 |

The invention has been described in detail with particular reference to certain preferred embodiments thereof, but it will be understood that variations and modifications can be effected within the spirit and scope of the invention.

We claim:

1. A photographic element containing at least one light sensitive silver halide layer and from about 0.05 grams to about 5.0 grams per square foot of support of an optical brightening interpolymer having the formula:

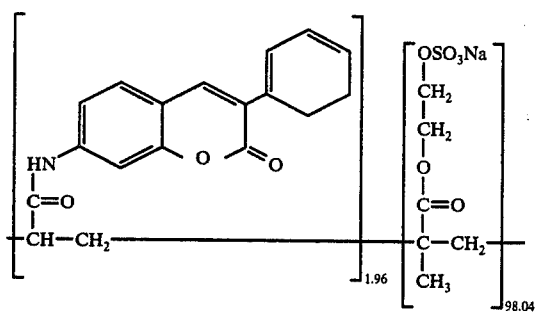

were compared to those of a like monomer having the formula:

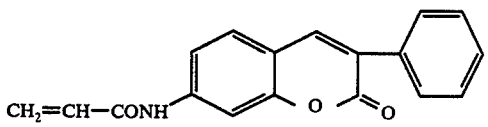

as follows.

A sample of a supported single-layer coating containing per square foot of coating 500 mg. of gelatin and 10 mg. of the above monomer dissolved in 500 mg. of dibutyl phthalate was subjected to a two-week SANS light-fading test and designated control. A sample of a supported single-layer coating containing per square foot of coating 500 mg. of gelatin and 200 mg. of polymer were subjected to the same light-fading test. The results are shown in Table 3.

Table 3

| Example | Brightener | Percent Fluorescence Emission Remaining After | |
|---|---|---|---|
| | | 1 week | 2 weeks |
| Control | monomer | 14 | 10 |
| 4 | polymer | 95 | 70 |

$$\left[ \begin{array}{c} R^1 \\ | \\ L \\ | \\ -CH-CH_2- \end{array} \right]_x \left[ \begin{array}{c} R \\ | \\ -CH_2-C- \\ | \\ R^2 \end{array} \right]_y \left[ -R^3- \right]_z$$

wherein
  L is a linking group selected from the group consisting of CONH, O, COO, $$\begin{array}{c} O \\ \| \\ C, \end{array}$$

S, SO$_2$ and $$\begin{array}{c} O \\ \| \\ S; \end{array}$$

R$^1$ is an optical brightener moiety;
  R is H or alkyl containing from 1 to 4 carbon atoms;
  R$^2$ is an anionic solubilizing group selected from the groups consisting of COOM, SO$_3$M, OSO$_3$M, COOR$^4$OSO$_3$M, PO$_3$ and PO$_4$, wherein M is H or an alkali metal and R$^4$ is alkylene containing from 1 to 4 carbon atoms;
  R$^3$ is a unit derived from a copolymerizable ethylenically unsaturated monomer;
  x is from 0.25 to 50 mole percent, y is from 5 to 99 mole percent and z is from 0 to 90 mole percent of the interpolymer.

2. The photographic element of claim 1 wherein the interpolymer is in a hydrophilic colloid layer.

3. The photographic element of claim 1 wherein the interpolymer is in a gelatin layer.

4. The photographic element of claim 1 wherein the optical brightener moiety is selected from the group consisting of coumarins, stilbenes, thiophenes and benzoxazoles.

5. The photographic element of claim 1 wherein x is from 2 to 25 mole percent and y is from 10 to 75 mole percent of the interpolymer.

6. The photographic element of claim 1 wherein R$^1$ comprises from about 1 to about 50 percent by weight of the interpolymer.

7. The photographic element of claim 1 wherein R$^3$ has the formula:

$$\begin{array}{c} CH_2=C-B \\ | \\ A \end{array}$$

wherein A is H or alkyl containing from 1 to 6 carbon atoms and B is COOR$^5$, COR$^5$, CN, or $$\begin{array}{c} O \\ \| \\ C-NR^5_2 \end{array}$$

wherein R$^5$ is alkyl containing from 1 to 6 carbon atoms.

8. A photographic element containing at least one light sensitive silver halide layer and from about 0.05 grams to about 5.0 grams per square foot of support of an optical brightening interpolymer having the formula:

[structure with NH-CO-CH-CH$_2$ attached to aromatic system with O linkage]$_x$ $$\left[ -CH_2-\underset{\underset{CO_2CH_2CH_2OSO_3Na}{|}}{\overset{\overset{CH_3}{|}}{C}}- \right]_y$$

$$\left[ -CH_2-CH- \atop | \atop CO_2C_4H_9 \right]_z$$

wherein x is from 0.25 to 50 mole percent, y is from 5 to 99 mole percent and z is from 0 to 90 mole percent of the interpolymer.

9. A photographic element containing at least one light sensitive silver halide layer and from about 0.05 grams to about 5.0 grams per square foot of support of a water soluble or water dispersible interpolymer having the formula:

[structure with NH-CO-CH-CH$_2$ with stilbene-type aromatic and O=C-O linkage]$_x$ $$\left[ \begin{array}{c} CH_2-OSO_3Na \\ | \\ CH_2 \\ | \\ O \\ | \\ C=O \\ | \\ -C-CH- \\ | \\ CH_3 \end{array} \right]_y$$

wherein x is from 0.25 to 50 mole percent and y is from 5 to 99 mole percent of the interpolymer.

10. An image receiving element containing at least one image receiving layer and from about 0.05 grams to about 5.0 grams per square foot of support of an optical brightening interpolymer having the formula:

$$\left[ \begin{array}{c} R^1 \\ | \\ L \\ | \\ -CH-CH_2- \end{array} \right]_x \left[ \begin{array}{c} R \\ | \\ -CH_2-C- \\ | \\ R^2 \end{array} \right]_y \left[ -R^3- \right]_z$$

wherein
L is a linking group selected from the group consisting of CONH, COO, $$\overset{O}{\underset{}{\overset{\|}{C}}},$$

S, $SO_2$ and $$\overset{O}{\underset{S}{\overset{\|}{\|}}};$$

$R^1$ is an optical brightener moiety;
R is H or alkyl containing from 1 to 4 carbon atoms;
$R^2$ is an anionic solubilizing group selected from the group consisting of COOM, $SO_3M$, $OSO_3M$, $COOR^4OSO_3M$, $PO_3$ and $PO_4$, wherein M is H or an alkali metal and $R^4$ is alkylene containing from 1 to 4 carbon atoms;
$R^3$ is a unit derived from a copolymerizable ethylenically unsaturated monomer;

x is from 0.25 to 50 mole percent, y is from 5 to 99 mole percent and z is from 0 to 90 mole percent of the interpolymer.

11. The image receiving element of claim 10 also containing photographic silver halide.

12. The image receiving element of claim 10 wherein x is from 2.0 to 25 mole percent and y is from 10 to 75 mole percent of the interpolymer.

13. The image receiving element of claim 10 wherein $R^3$ has the formula:

$$CH_2=\underset{A}{\overset{}{\underset{|}{C}}}-B$$

wherein A is H or alkyl containing from 1 to 6 carbon atoms and B is $COOR^5$, $COR^5$, CN, or $$\overset{O}{\underset{}{\overset{\|}{C}}}-NR^5{}_2$$

wherein $R^5$ is alkyl containing from 1 to 6 carbon atoms.

* * * * *

UNITED STATES PATENT OFFICE
CERTIFICATE OF CORRECTION

PATENT NO. : 4,106,941

DATED : August 15, 1978

INVENTOR(S) : Peter W. Scullard, John Figueras and Carl F. Holtz

It is certified that error appears in the above-identified patent and that said Letters Patent are hereby corrected as shown below:

Column 2, line 41, "9" should read --O--;
Column 21, line 3, after "CONH," --O-- should be inserted.

Signed and Sealed this

Tenth Day of April 1979

[SEAL]

Attest:

RUTH C. MASON
Attesting Officer

DONALD W. BANNER
Commissioner of Patents and Trademarks